United States Patent [19]
Gonzalez et al.

[11] Patent Number: 5,546,290
[45] Date of Patent: * Aug. 13, 1996

[54] NEON ILLUMINATION APPARATUS AND METHOD OF USING SAME

[75] Inventors: Jaime D. Gonzalez, 9390 Suva, Downey, Calif. 90240; Michael J. Talbert, Huntington Beach, Calif.

[73] Assignee: Jaime D. Gonzalez, Huntington Park, Calif.

[*] Notice: The portion of the term of this patent subsequent to Sep. 29, 2009, has been disclaimed.

[21] Appl. No.: 5,643

[22] Filed: Jan. 19, 1993

Related U.S. Application Data

[63] Continuation-in-part of Ser. No. 839,814, Feb. 21, 1992, Pat. No. 5,192,125, which is a continuation of Ser. No. 741,784, Aug. 6, 1991, Pat. No. 5,150,961.

[51] Int. Cl.$^6$ ..................................................... F21V 31/00
[52] U.S. Cl. .......................... 362/223; 362/263; 362/80; 362/265; 362/267
[58] Field of Search ...................................... 362/83.2, 216, 362/217, 221, 222, 223, 263, 265, 267, 80

[56] References Cited

U.S. PATENT DOCUMENTS

| | | |
|---|---|---|
| 2,214,447 | 1/1939 | Bave . |
| 2,562,740 | 3/1948 | Rizer . |
| 2,618,089 | 9/1949 | Rose . |
| 2,689,948 | 10/1950 | Rothman . |
| 3,249,749 | 5/1966 | Haas ........................................ 362/221 |
| 3,921,324 | 11/1975 | Flannery . |
| 4,091,443 | 5/1978 | Ohrenstein et al. ...................... 362/156 |
| 4,352,539 | 10/1982 | Vest ........................................ 362/221 |
| 4,654,763 | 3/1987 | Knight .................................... 362/156 |
| 4,727,459 | 2/1988 | Palumbo . |
| 4,857,890 | 8/1989 | Solow . |
| 4,912,611 | 3/1990 | Lyle ........................................ 362/156 |
| 4,954,934 | 9/1990 | Kladder et al. .......................... 362/156 |
| 4,958,267 | 9/1990 | Baake ...................................... 362/221 |
| 5,018,057 | 5/1991 | Biggs et al. ............................. 362/295 |
| 5,029,053 | 7/1991 | Solow . |
| 5,156,455 | 10/1992 | Kuo . |
| 5,412,549 | 5/1995 | Blakely ................................... 362/223 |

*Primary Examiner*—Ira S. Lazarus
*Assistant Examiner*—Sara Sachie Raab
*Attorney, Agent, or Firm*—Bernard L. Kleinke; Jerry R. Potts

[57] ABSTRACT

A new and improved neon illumination apparatus and method for illuminating large and small areas, such as the exterior and interior of a motor vehicle and the like, with bright glowing light. The apparatus includes an elongated transparent tube holder member for receiving an elongated neon bulb and a high voltage power distribution system. The high voltage power distribution system is encapsulated with an end cap adapted to be secured to the tube holder member for insulating and sealing the neon bulb and distribution system from the exterior environment and for forming a unitary illuminating device. The end cap includes an electrical input arrangement adapted to be coupled to a conventional low voltage, direct current source, such as the low voltage electrical system of a vehicle.

In the preferred form of the present invention, the high voltage power distribution system includes a power converter for transforming low voltage direct current to low voltage, high frequency alternating current and a high voltage, high frequency transformer coupled to the power converter for generating high voltage, high frequency electrical power to energize the neon tube.

The preferred method of using the apparatus is to mount the device in an area to be illuminated, such as the interior or exterior of a motor vehicle, and to connect the apparatus to a source of low voltage, direct current power, such as the low voltage electrical system of a vehicle. In this regard, the apparatus can be utilized for conventional vehicle illumination purposes.

16 Claims, 4 Drawing Sheets

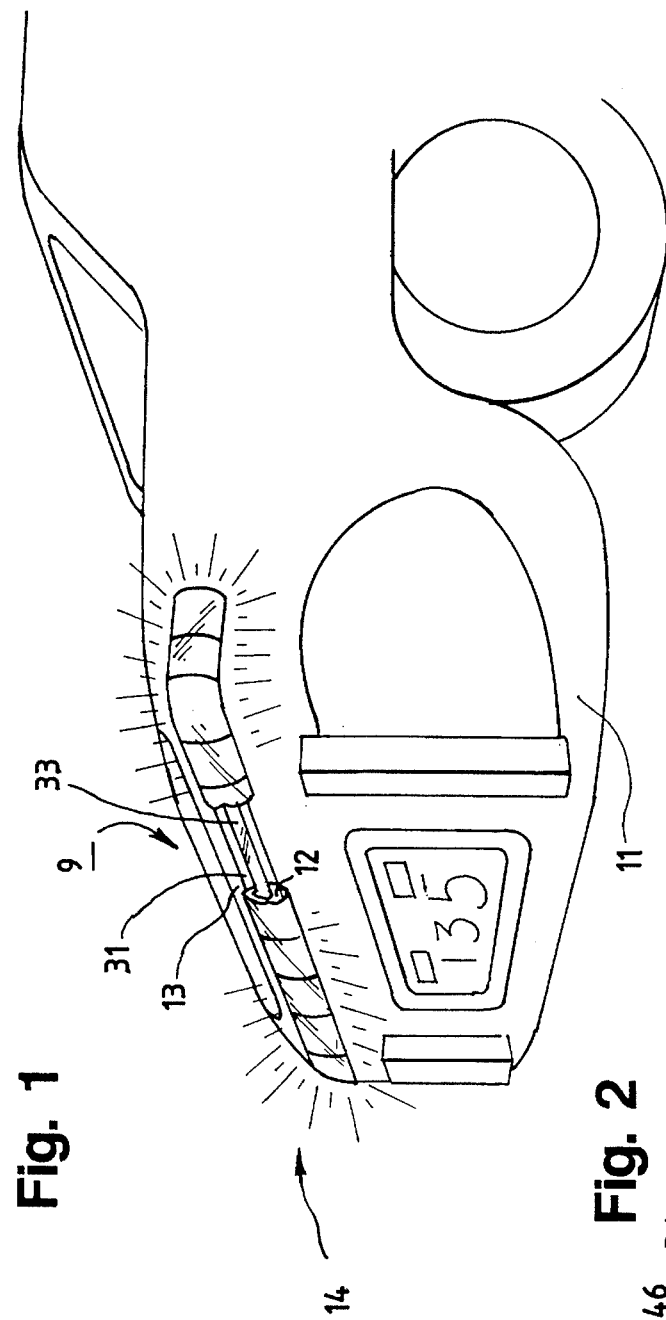
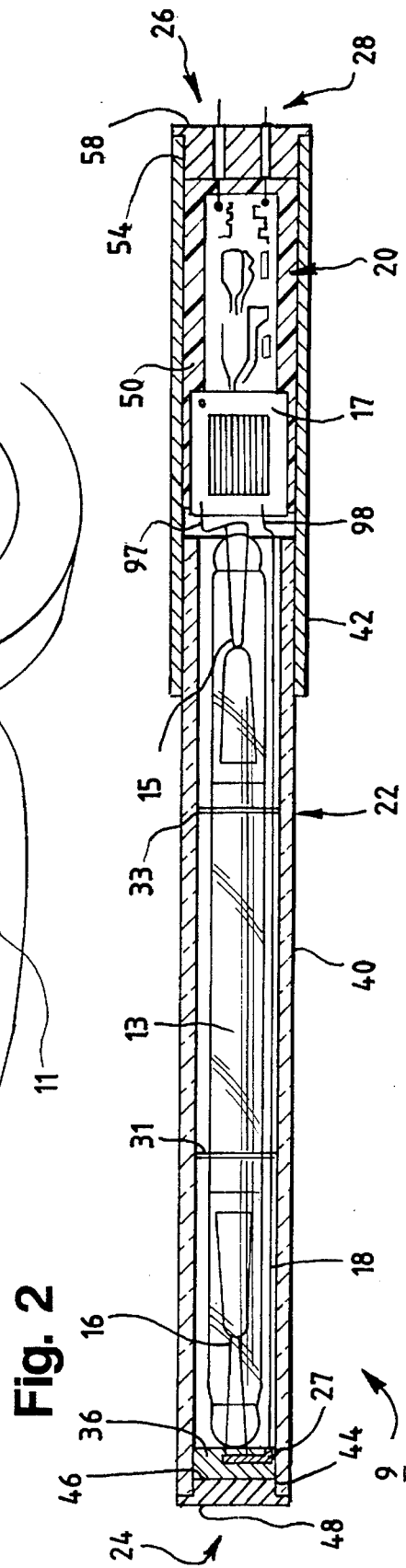

5,546,290

NEON ILLUMINATION APPARATUS AND METHOD OF USING SAME

CROSS-REFERENCE TO RELATED APPLICATIONS

This application is related to U.S. patent application entitled "APPARATUS FOR ILLUMINATING A VEHICLE LICENSE PLATE AND METHOD OF USING SAME," filed concurrently herewith on Jan. 11, 1993, and is a continuation-in-part of U.S. patent application 07/839,814 filed Feb. 21, 1992, now U.S. Pat. No. 5,192,125, which is a continuation of U.S. patent application 07/741,784 filed Aug. 6, 1991, now U.S. Pat. No. 5,150,961, which applications and patents are commonly owned and incorporated herein by reference.

TECHNICAL FIELD

This invention relates in general to an illumination apparatus and method of using same, and more particularly it relates to a neon illumination apparatus and method for illuminating a vehicle or other items or areas with a bright glowing light.

BACKGROUND

There have been may different types and kinds of illumination devices for vehicles and the like. For example, reference may be made to the following U.S. Pat. Nos. 2,214,447; 2,562,740; 2,618,089; 2,689,948; 3,921,324; 3,968,359; 4,727,459; 4,857,890; 5,029,053; and 5,156,455.

While several of the above-referenced patents disclose the use of neon illumination apparatus for vehicles and the like, such devices have not been entirely satisfactory. In this regard, elongated neon tubes used for illuminating large areas are generally fragile and break easily when jarred or impacted suddenly. Thus, installation of such neon illumination apparatus and associated tubes has been relatively expensive and time consuming requiring the use of special mounting bands, hoops, or frames and cushioning materials.

Therefore it would be highly desirable to have a new and improved neon illumination apparatus and method of using it for illuminating a vehicle that would be easy to install in a relatively fast and convenient manner and that would protect the neon tube against easy breakage.

Another problem associated with the use of neon illumination apparatus is associated with its energization. In this regard, neon tubes are typically operated from high voltage, high current electrical sources that are not readily available in conventional automobile electrical systems. Moreover, even if such sources were available, the routing of high voltage cables within a vehicle could pose a safety hazard.

Therefore, it would be highly desirable to have a new and improved neon illumination apparatus and method of using it that would be safe and that would be used with conventional low voltage, direct current voltage sources.

One such attempt describes a license plate holder for a neon illuminating device to provide a source of bright glowing light to illuminate the vehicle and its license plate. In this arrangement a low voltage, high frequency transformer is mounted in the trunk of the vehicle and is coupled to a high voltage, high frequency transformer mounted within the holder secured to the vehicle. While this method has proven highly successful, it would be desirable to have an improved method and neon illumination apparatus for providing a source of bright glowing light that would not require the mounting of a special power supply within the trunk of the vehicle, that would be safe, and that would be protected against easy breakage.

DISCLOSURE OF INVENTION

It is the principal object of this invention to provide a new and improved neon illumination apparatus and method of using it with relative safety from accidental high voltage, high current electrical shock.

It is a further object of the present invention to provide such a new and improved neon illumination apparatus which can be installed easily and quickly by relatively unskilled and untrained personnel.

Another object of the present invention is to provide such a new and improved neon illumination apparatus for illuminating large and small areas with bright glowing light.

Briefly, the above and further object of the present invention are realized by providing a new and improved neon illumination apparatus and method for illuminating large and small areas, such as the exterior and interior of a motor vehicle and the like, with bright glowing light. The apparatus includes an elongated transparent tube holder member for receiving an elongated neon bulb and a high voltage power distribution system. The high voltage power distribution system is encapsulated within an end cap member adapted to be secured to the tube holder member for insulating and sealing the neon bulb and high voltage power distribution system from the exterior environment and for forming a unitary neon illumination device. The end cap member includes an electrical input arrangement adapted to be coupled to a conventional low voltage, direct current source, such as the low voltage electrical system of a vehicle.

In the preferred form of the present invention, the high voltage power distribution system includes a power converter for transforming low voltage direct current to low voltage, high frequency alternating current and a high voltage, high frequency transformer coupled to the power converter for generating high voltage, high frequency electrical power to energize the neon tube.

The preferred method of using the apparatus is to mount the device in an area to be illuminated, such as the interior or exterior of a motor vehicle, and to connect the apparatus to a source of low voltage, direct current power, such as the low voltage electrical system of a vehicle. In this regard, the apparatus can be utilized for conventional vehicle illumination purposes.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein:

FIG. 1 is a partially cut away pictorial view of a neon illumination apparatus, which is constructed in accordance to the present invention and which is shown illustratively mounted in the tail light compartment of a motor vehicle;

FIG. 2 is a diagrammatic view of the neon illumination apparatus of FIG. 1.

BEST MODE FOR CARRYING OUT THE INVENTION

Figure 3:
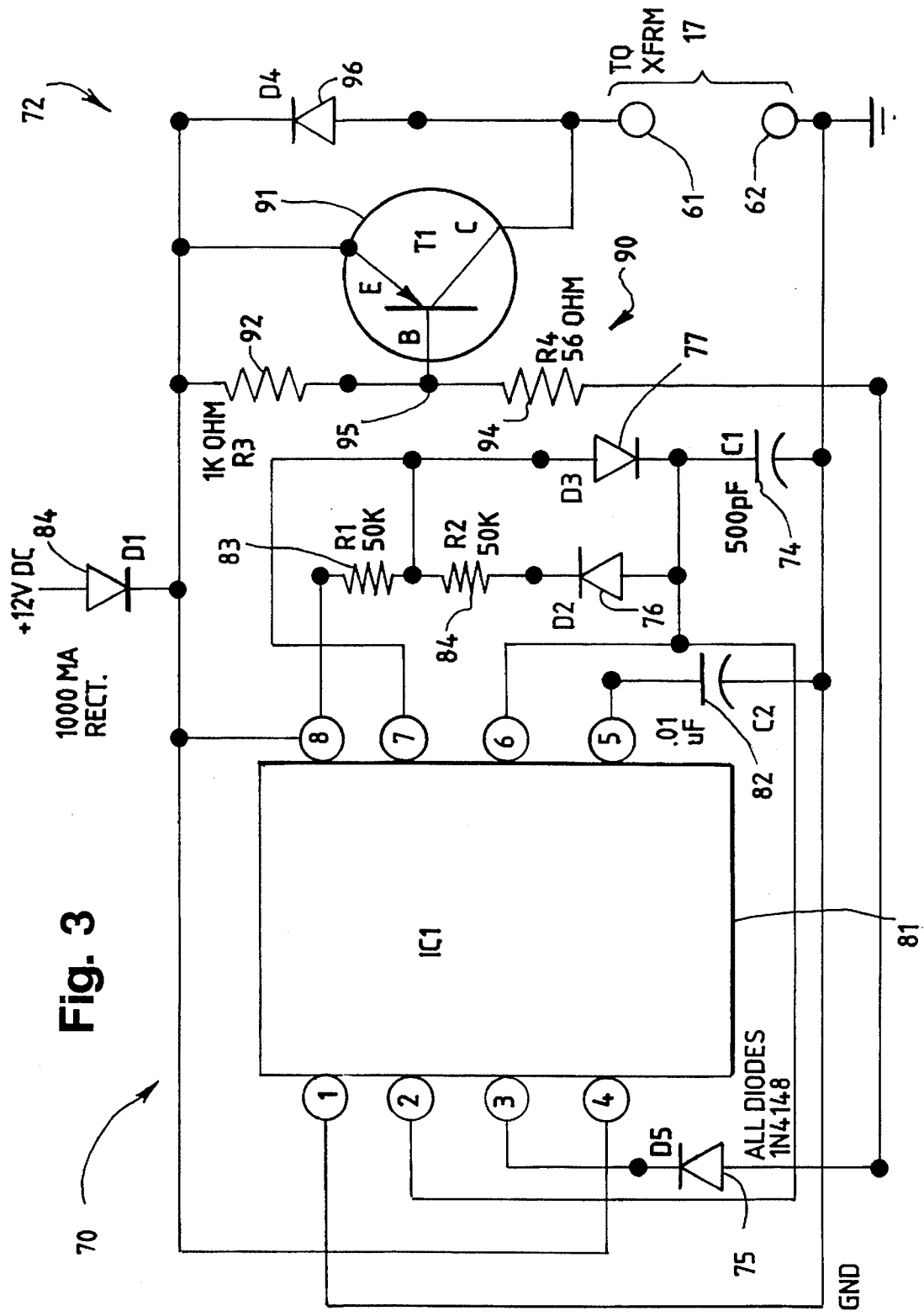
FIG. 3 is a schematic diagram of a power converter circuit of FIG. 2.

Referring now to the drawings and more particularly to FIG. 1 thereof, there is shown a new and improved neon illumination apparatus 9 which is constructed in accordance with the present invention. The illumination apparatus 9 is illustrated mounted to the exterior of a motor vehicle 11 and operatively coupled to the electrical system of the motor vehicle 11. While in the preferred form of the present invention the apparatus 9 is illustrated in use with a motor vehicle, it will be understood by those skilled in the art that apparatus 9 can be coupled to any source of low voltage, direct current power for illuminating any desired area, such as walkways, entrance ways and other exterior and interior structures and surfaces.

The neon illumination apparatus 9 generally comprises an elongated neon tube 13 having a pair of oppositely disposed electrodes 15 and 16 respectively. The electrodes 15 and 16 are connected across the secondary output of a high voltage, high frequency step-up transformer 17. A power converter circuit, shown generally at 20, is connected across the primary input of the transformer 17 and supplies the transformer 17 with a low voltage, high frequency signal. The neon tube 13, transformer 17 and power converter 20 are mounted within an elongated tube holder member 22 having a pair of end cap members 24 and 26, respectively, disposed thereon. The end cap members 24 and 26 are adapted to seal the neon tube 13, transformer 17 and power converter 20 within the tube holder member 22 to isolate them for protection against accidental electrical shock. For the purpose of electrically energizing the power converter 20, the end unit 26 is adapted with a power connector shown generally at 28.

In use, the neon illumination apparatus 9 is mounted by means not shown in any desired area to be illuminated with a bright glowing light. For example, as best seen in FIG. 1, the apparatus 9 is mounted in the tail light compartment 12 of the motor vehicle 11. When mounted, the power connector 28 is attached to the electrical system of the motor vehicle 11 by any conventional means, such as electrical wire connectors. In this manner, when the electrical system of the vehicle 11 is activated, the neon tube 13 will be energized electrically causing the tail light compartment 12 to be illuminated with a bright glowing light, indicated generally at 14.

Considering now the tube holder member 22 in greater detail with reference to FIG. 2, the tube holder member 22 is adapted to receive the neon tube 13 therewith to isolate it for protection from the environment external to the member 22 and for helping to protect the neon tube 13 from breakage. The tube member 22 generally includes a hollow tube receiving member 40 and a hollow power distributor receiving member 42. The member 40 is composed of a suitable transparent material, such as a polycarbonate material sold under the trade name Lexan®. The overall longitudinal length and inside diameter of the tube member 40 is dimensioned for receiving the neon tube 13 completely therewithin.

The member 42 is comprised of a suitable transparent material, such as a polycarbonate tubing material and has an overall longitudinal length and inside diameter for receiving the transformer 17 and power converter 20 completely therewithin. The outside diameter of the member 42 is dimensioned to permit the member 42 to be received on an end portion of the member 40 as best seen in FIG. 2.

In order to help facilitate cushioning the neon tube 13 from accidental breakage, the tube 13 is secured removably within member 40 by a set of spaced apart resilient O-rings, such as the 0-rings 31 and 33. The inside diameter of each O-ring, such as the 0-ring 33, is slightly smaller than the outside diameter of the tube 13 in order to allow the O-rings to surround the outside periphery of the tube 13 and to be secured removably to the tube 13. Each O-ring, such as the O-ring 33, is composed of a soft rubber material and is dimensioned so that its outside diameter is slightly larger than the inside diameter of the member 40. From the foregoing it should be understood the O-rings 31 and 33 both cushion and secure the neon tube 13 from breakage within the member 40.

Considering now the end cap 24 in greater detail with reference to FIG. 2, the end cap 24 is composed of an ABS plastic material and is dimensioned to seal one end of the member 40. In this regard, the cap 24 includes a cylindrically shaped base portion 44 having a face 46 and an integrally connected flange portion 48. The base portion 44 is dimensioned to be received snugly within the interior of member 40. The flange portion 48 has an outside diameter which is substantially equal to the outside diameter of the member 40 and acts as a stop for positioning the face slightly spaced apart from the tube 13 when it's received within the member 40.

As best seen in FIG. 2, the end cap 24 also includes a metallic clip 27 that enables an electrical and mechanical connection to be established between the electrode 16 and a small copper conductor 18 which extends longitudinally along an inside wall of the member 22. As will be explained hereinafter, the opposite end of the conductor 18 is connected electrically to one of the output terminals of the step-up transformer 17.

A layer 36 of soft resilient material, such as a rubber material which does not interfere with the mechanical and electrical connection between the electrode 16 and the clip 27 is disposed on the face 41 of the cap 16 for further cushioning of the tube 13.

Considering now the end cap 26 in greater detail with reference to FIG. 2, the end cap 26 includes a cylindrical shaped base portion 54 and an integrally connected flange portion 58. The base portion 54 is dimensioned to be received snugly within the interior of member 42. The flange portion 58 has an outside diameter which is substantially equal to the outside diameter of the member 42 and acts as a stop for positioning the power connector 28 relative to the power converter 20 as will be explained hereinafter.

As best seen in FIG. 2, the end cap 24 also includes the power connector 28 that enables an electrical and mechanical connector to be established between the power converter 20 and a source of low voltage, direct current power (not shown) such as the electrical system of a motor vehicle or conventional AC to DC converter.

In order to facilitate mounting the transformer 17 and power converter 20 within the member 42, after the converter 20 is connected to the connector 28, an encapsulation compound or resin indicated generally at 50 poured into the interior of member 42 completely covering the transformer 17 and power converter 20. When the resin sets, the transformer 17 and converter 20 are secured within the member 42.

Considering now the power converter 20 in greater detail with reference to FIG. 3, the power converter 20 generally includes a high frequency oscillator circuit 70 and power Darlington arrangement 72 for converting a low voltage, direct current electrical signal, such as a 12 VDC signal into a low voltage, high frequency signal, such as a 12 volt, 40,000 Hz signal. As best seen in FIG. 3, the power converter 20 also includes a filter capacitor 74 and a set of transient protection diodes 75–77 respectively. Diodes 75–77 are 1N4148 diodes while capacitor 74 is a 50 V, 500 picofarads ceramic disk capacitor.

Considering now the oscillator circuit 70 in greater detail with reference to FIG. 3, the oscillator circuit 70 generally includes a NE555 timer or oscillator chip 81 whose oscillation period is determined by a capacitor 82 and a pair of resistors 83 and 84. In order to establish an oscillation frequency between 8,000 Hz and 40,000 Hz, capacitor 82 is a 50 V, 0.01 microfarad ceramic disk capacitor, while resistors 83 and 84 are each 50K ohms. As noted above, the oscillator has a frequency range between about 8,000 and about 40,000 Hz. A more preferred range is between about 20,000 Hz and 35,000 Hz, while the most preferred frequency is about 25,000 Hz.

In operation, a source of low voltage, direct current power, such as a 12 VDC, source is coupled to the oscillator 81 via a rectifier or protection diode 84 which prevents reverse voltages being applied to the oscillator 81 as well as the power Darlington arrangement 72. Diode 84 is a 1N4001 1,000 milliamp rectifier or equivalent.

Considering now the power Darlington arrangement 72 in greater detail, the Darlington arrangement generally includes a Darlington power transistor 91 whose base is driven by the high frequency output signal generated by the oscillator 81. In order to establish a proper base bias voltage for the transistor 91, the arrangement 72 also includes a divider network 90 which is coupled between the output (pin 3) of oscillator 81 and the anode of diode 75. The transistor 91 is a ECG156 transistor.

The divider network 90 includes a pair of series connected resistors 92 and 94, respectively. Resistors 92 and 94 are connected to the base of transistor 90 via a common node 95. The resistors 92 and 94 are 1K ohms and 56 ohms respectively. In order to protect the base of transistor 91 from spurious transient spikes, the output of the oscillator 81 is coupled to resistor 94 via the diode 74.

In order to prevent the transistor 91 from latching due to the inductive load of transformer 17, a diode 96 is connected between the emitter and collector of transistor 91. Diode 16 is a 1N4148 diode whose cathode is connected to the emitter of transistor 91 and whose anode is connected to the collector of transistor 91.

The output of the power Darlington arrangement 72 is coupled to the electrode 15 via a conductor 97 and is returned to ground via a conductor 98. As best seen in FIG. 2, the conductor 98 is electrically and mechanically connected to conductor 18 to establish a ground return for the tube 13.

Figure 4:
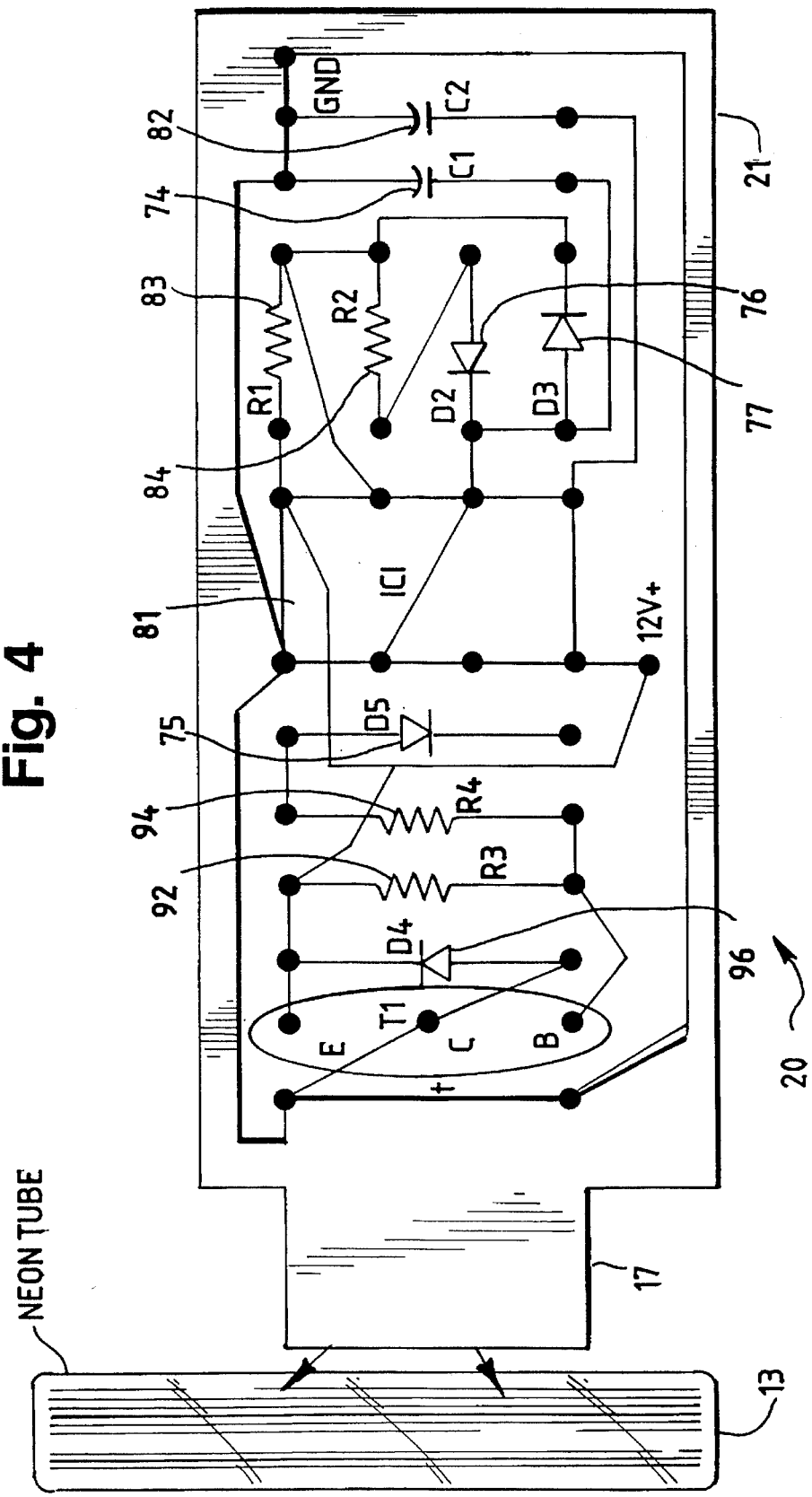
FIG. 4 is a printed circuit board layout for the power converter circuit of FIG. 2 shown diagrammatically connected to a neon tube and step-up transformer.

Considering now the power converter 20 in still greater detail with reference to FIG. 4, the power converter 20 also includes a small elongated printed circuit board shown generally at 21. The printed circuit board 21 is sufficiently small to be received within the member 42. The transformer 17 is mounted to the circuit board 21 across the output pins of the converter 20. In this regard, transformer 17 is connected to output pins 61 and 62 respectively.

Considering now the transformer 17 in greater detail, the transformer 17 is an E-core powered ferrite transformer manufactured by Neonize Corporation of Huntington Park, Calif. The transformer 17 includes a primary having between about 6 and about 30 windings of AWG23 wire and a secondary having between about 1200 and about 3000 windings of AWG41 wire.

A more preferred number of primary windings is between about 12 and about 28 windings. The most preferred number of primary windings is about 24.

A more preferred number of secondary windings is between about 1800 and about 2800 windings. The most preferred number of secondary windings is about 2400.

While in the preferred form of the present invention the neon illumination apparatus 9 is illustrated mounted within the tail light compartment of a motor vehicle, it will be understood by those skilled in the art that the apparatus 9 can be mounted at other locations within the vehicle. For example apparatus 9 may be mounted by means not shown for interior lighting of the vehicle as well as on the underside of the vehicle for exterior lighting purposes.

Figure 5:
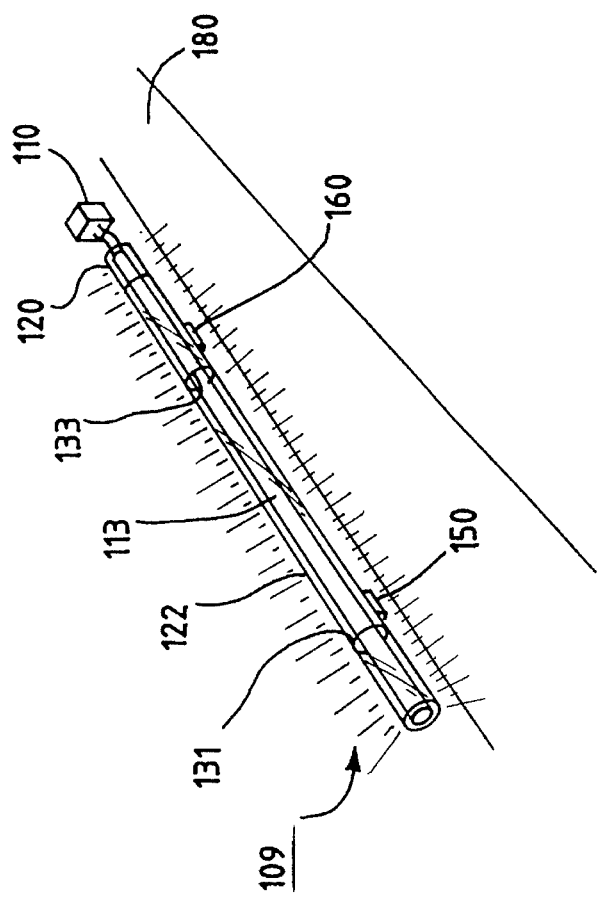
FIG. 5 is a pictorial view of a neon illumination apparatus, which is constructed in accordance to the present invention and which is shown illustratively mounted for lighting a walkway.
Figure 6:
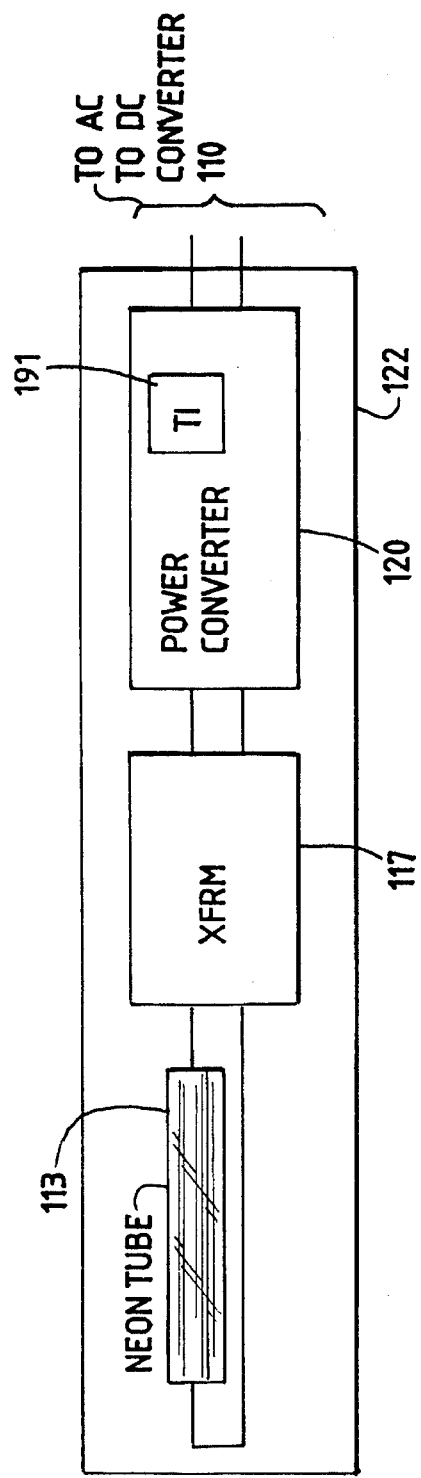
FIG. 6 is a highly diagrammatic diagram of the apparatus of FIG. 5 illustrating the interconnection between its component parts.

Referring now to the drawings and more particularly to FIG. 5 thereof, there is shown a neon lighting apparatus 109 for illuminating a walkway 180 with bright glowing light. The neon lighting system 109 is similar to apparatus 9 and includes a neon tube 113, a pair of O-rings 131 and 133 and a tube holder member 122. The tube holder member 122 is supported from the ground by a pair of supports 150 and 160 respectively. The apparatus 109 also includes an alternating current to direct current converter 110. In this regard, the converter 110 is coupled to a source of 110 VAC power and converts this power to 12 VDC for energizing a power converter 120 having a transistor 191 associated therewith. The transistor 191 is similar to transistor 91 except that it is a 2N6191.

While in the preferred form of the present invention the neon illumination apparatus 109 is illustrated mounted outside adjacent a walkway, it will be understood by those skilled in the art that apparatus 109 can be mounted at other locations such as interior and exterior of homes, offices and other structures.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An illumination apparatus, comprising:

elongated tube means for illuminating a desired area with bright glowing light;

elongated hollow tube member means for receiving said elongated tube means therewithin;

high voltage, high frequency transformer means mounted within said tube member means for supplying said tube means with sufficient high voltage, high frequency electrical power to cause it to radiate bright glowing light;

power converter means mounted within said tube member means for supplying said high voltage, high frequency transformer means with low voltage, high frequency electrical power;

said tube member means including end cap means for helping to seal said tube means, said high voltage, high frequency transformer means, and said power converter means within said tube member means;

said end cap means including means for coupling said power converter means to a source of low voltage, direct current electrical power.

2. An illuminating apparatus according to claim 1 wherein said tube means is neon tube means.

3. An illuminating apparatus according to claim 2 wherein said neon tube means includes means adapted to be coupled to said high voltage, high frequency transformer means.

4. An illuminating apparatus according to claim 1 further comprising:

a plurality of spaced apart resilient O-rings, each one of said O-rings surrounding a different portion of said elongated tube means for securing said tube means within said hollow tube member means and for protecting said tube means from breakage against tube member means.

5. An illumination apparatus according to claim 4 wherein said tube member means has an inside diameter and wherein each individual O-ring has an outside diameter, said inside diameter and outside diameter being substantially equal.

6. An illuminating apparatus according to claim 1 wherein said power converter means includes:

oscillator means coupled to said source of low voltage, direct current electrical power for producing a high frequency signal; and power transistor means responsive to such high frequency signal for supplying said high voltage, high frequency transformer with the low voltage, high frequency electrical power.

7. An illuminating apparatus according to claim 1 wherein said transformer means and said power converter means are encapsulated within said end cap means.

8. An illuminating apparatus according to claim 7 wherein said power converter means is mounted on a printed circuit board.

9. A method of illuminating a desired area with bright glowing light mounting elongated neon tube means within elongated hollow tube member means;

mounting high voltage, high frequency transformer means within said elongated hollow tube member means;

coupling said neon tube means to said high voltage, high frequency transformer means to supply said neon tube means with sufficient high voltage, high frequency electrical power to cause it to radiate bright glowing light;

mounting power converter means within said elongated hollow tube member means;

coupling said high voltage, high frequency transformer means to said power converter means to supply said transformer means with low voltage, high frequency electrical power;

sealing said neon tube means, said high voltage, high frequency transformer means, and said power converter means within said elongated hollow tube member means; and coupling said power converter means to a source of low voltage, direct current electrical power.

10. An illumination apparatus, comprising:

neon tube illuminating means for radiating bright glowing light;

low voltage power converter means for energizing said neon tube illuminating means with high voltage, high frequency power;

said low voltage power converter means including high voltage, high frequency transformer means coupled to said neon tube illumination means for supplying said neon tube illumination means with high voltage, high frequency power; power transistor means for supplying said high voltage, high frequency transformer means with low voltage, high frequency electrical power; and oscillator means coupled to said transistor means for supplying said transistor means with a high frequency electrical signal;

hollow tube member means for receiving said neon tube means and said power converter means therewithin; and end cap means adapted to couple a source of low voltage, direct current power to said power converter means for energizing said power converter means and for sealing said neon tube means and said power converter means within said hollow tube member means.

11. An illumination apparatus, comprising an elongated neon tube for radiating bright glowing light;

high voltage power distribution means responsive to a low voltage, direct current signal; and elongated tube holder means for receiving said neon tube and said high voltage distribution means therewith for protecting said neon tube and said high voltage distribution means from exterior elements and for forming a unitary neon device.

12. An illumination apparatus according to claim 11, wherein said source of low voltage, direct current electrical power is, an electrical system of a motor vehicle.

13. An illumination apparatus according to claim 11, wherein said apparatus is adapted to be mounted to an exterior surface to illuminate a surrounding area with bright glowing light.

14. An illumination apparatus according to claim 13, wherein said exterior surface is a surface disposed on an vehicle.

15. An illumination apparatus according to claim 11, wherein said apparatus is adapted to be mounted to an interior surface to illuminate a surrounding area with bright glowing light.

16. An illumination apparatus according to claim 15, wherein said interior surface is a surface disposed on a vehicle.

* * * * *